(12) United States Patent
Stone et al.

(10) Patent No.: US 11,043,198 B1
(45) Date of Patent: *Jun. 22, 2021

(54) ACOUSTICAL PANEL SUBSURFACE LAYER

(71) Applicant: Navy Island, Inc, West St. Paul, MN (US)

(72) Inventors: Jeffrey Stone, West St. Paul, MN (US); Chad Stone, West St. Paul, MN (US)

(73) Assignee: Navy Island, Inc., West St. Paul, MN (US)

( * ) Notice: Subject to any disclaimer, the term of this patent is extended or adjusted under 35 U.S.C. 154(b) by 511 days.

This patent is subject to a terminal disclaimer.

(21) Appl. No.: 15/992,501

(22) Filed: May 30, 2018

Related U.S. Application Data

(60) Provisional application No. 62/513,344, filed on May 31, 2017.

(51) Int. Cl.
*G10K 11/168* (2006.01)
*B32B 3/26* (2006.01)
(Continued)

(52) U.S. Cl.
CPC .......... *G10K 11/168* (2013.01); *B32B 3/266* (2013.01); *B32B 5/022* (2013.01); *B32B 7/12* (2013.01); *B32B 15/14* (2013.01); *B32B 21/10* (2013.01); *B32B 21/14* (2013.01); *B32B 27/12* (2013.01); *B32B 27/304* (2013.01); *B32B 2260/021* (2013.01); *B32B 2260/046* (2013.01); *B32B 2262/101* (2013.01); *B32B 2307/102* (2013.01); *B32B 2307/3065* (2013.01); *B32B 2451/00* (2013.01)

(58) Field of Classification Search
CPC ....... G10K 11/168; B32B 3/266; B32B 5/022; B32B 7/12; B32B 15/14; B32B 21/10; B32B 21/14; B32B 27/12; B32B 27/304; B32B 2260/021; B32B 2260/046; B32B 2262/101; B32B 2307/3065; B32B 2307/102; B32B 2451/00
USPC .......................................................... 181/290
See application file for complete search history.

(56) References Cited

U.S. PATENT DOCUMENTS 7,419,031 B2 * 9/2008 Liguore .................... B32B 3/12
181/210
9,691,370 B1 * 6/2017 Stone ................... G10K 11/168
(Continued)

FOREIGN PATENT DOCUMENTS

WO WO-2018074474 A1 * 4/2018 .......... D04H 1/4374

*Primary Examiner* — Forrest M Phillips
(74) *Attorney, Agent, or Firm* — Dicke, Billig & Czaja, PLLC

(57) ABSTRACT

A thermally and hygroscopically stable subsurface layer for supporting an outer (typically visible) surface of an acoustical panel. The subsurface layer comprises a thermally and hygroscopically stable composite, specifically a non-woven or woven fabric impregnated with binder and filler materials. The fabric provides exceptional resistance to thermal expansion and contraction, while the binder and filler materials are naturally very resistant to moisture changes. The result resists warping, cupping, or bowing in response to changes in ambient moisture or temperature, especially in situations in which the laminated surface and subsurface layers are perforated to allow sound to enter the interior or the panel and be absorbed by suitable materials within the panel.

10 Claims, 3 Drawing Sheets

(51) Int. Cl.
*B32B 21/10* (2006.01)
*B32B 21/14* (2006.01)
*B32B 27/12* (2006.01)
*B32B 27/30* (2006.01)
*B32B 7/12* (2006.01)
*B32B 15/14* (2006.01)
*B32B 5/02* (2006.01)

(56) References Cited

U.S. PATENT DOCUMENTS

| | | | | |
|---|---|---|---|---|
| 9,715,872 | B2* | 7/2017 | Guzman | B32B 5/02 |
| 9,747,883 | B2* | 8/2017 | Demo | G10K 11/162 |
| 10,336,433 | B2* | 7/2019 | Stache | G10K 11/168 |
| 10,418,017 | B1* | 9/2019 | Keeley | G10K 11/168 |
| 2009/0321183 | A1* | 12/2009 | Johnson | B32B 5/024 |
| | | | | 181/290 |
| 2016/0297174 | A1* | 10/2016 | Kim | D04H 1/4374 |
| 2016/0300561 | A1* | 10/2016 | Kim | B29B 11/12 |
| 2017/0291681 | A1* | 10/2017 | Butts | B64C 1/40 |
| 2017/0358289 | A1* | 12/2017 | Israel | B32B 3/08 |
| 2018/0347264 | A1* | 12/2018 | Wang | E04B 1/86 |
| 2019/0156812 | A1* | 5/2019 | Bixel | B32B 7/12 |
| 2019/0161157 | A1* | 5/2019 | Ravise | F02C 7/045 |

\* cited by examiner

ACOUSTICAL PANEL SUBSURFACE LAYER

CROSS-REFERENCE TO RELATED APPLICATION

This application claims priority to U.S. Provisional Patent Application No. 62/513,344 filed May 31, 2017.

TECHNICAL FIELD

This application pertains to layers used in acoustical panels which control or adjust the acoustics of an interior space, such as an auditorium or concert hall, conference room, etc. They typically comprise several layers of material, including outer (visible) surface layers of wood veneer, vinyl, or paint; and sub-surface layers for mechanical support, acoustical absorption, and other purposes.

BACKGROUND

Acoustical panels commonly used to control or adjust the acoustics of an interior space, such as an auditorium or concert hall, conference room, etc., are typically visible and thus exposed to ambient conditions such as variable temperature and humidity. The panels are often mounted onto interior structural walls, or suspended from ceilings, as opposed to being part of the building structure itself. Thus, they are relatively flexible and can, in extreme cases, warp or move in response to variations in ambient conditions over time, because such changes may affect different layers or materials of the panels in different ways or by different amounts.

SUMMARY

One embodiment is an acoustical panel for absorbing sound from a source. The panel has a surface layer defining within itself a plurality of microperforations characterized by average diameters in a range of 0.3 to 0.9 millimeter. The surface layer comprises a decorative, visible material (such as wood veneer or another material) present on an outer surface of a thermally and hygroscopically stable composite substrate. This substrate comprises a non-woven or woven fabric impregnated with binder and filler materials and treated to form a composite in which the fabric provides exceptional resistance to thermal expansion and contraction, while the binder and filler materials are naturally very resistant to moisture changes.

The panel also has an acoustical absorbing layer, on an opposite side of the surface layer from the source of sound, comprising any suitable material but most preferably a combination of a support matrix defining a plurality of cells and fiberglass acoustical absorbing material of at least six pounds per cubic foot filling each cell, the fiberglass comprising individual sheets of fibers having fiber axes lying along a direction corresponding to panel thickness.

A back layer of the panel is on an opposite side of the acoustical absorbing layer from the surface layer. The back layer may be solid or perforated. In the most preferred embodiment, the back layer is also a stable substrate, like the one which supports the visible decorative layer. However, contrary to typical practice it is not necessary to provide this layer with its own surface layer (that is, a layer of material the same or having the same properties as the visible surface layer even though this back surface layer might not be visible). The improved performance of the stable substrate renders the acoustical panel as a whole balanced in terms of resistance to warping or other distortions without such a "visible" layer on the back of the panel.

DETAILED DESCRIPTION

In general, an architectural acoustical panel comprises multiple layers, such as a surface layer which faces the room or sound source, which in turn may comprise a decorative surface such as wood veneer, vinyl, paint or decorative laminate. The decorative surface is laminated to a supporting layer and defines a plurality of openings (e.g., microperforations) extending entirely through the surface layer. Sound enters the openings and is absorbed by an acoustic insulation, such as wood wool material or, most preferably, high-density fiberglass having a particular orientation. A back support layer is typically included to balance the panel and provide a surface for mounting the panel to the building structure (such as by wall brackets, or mounts used to suspend the panel from a ceiling).

Figure 1:
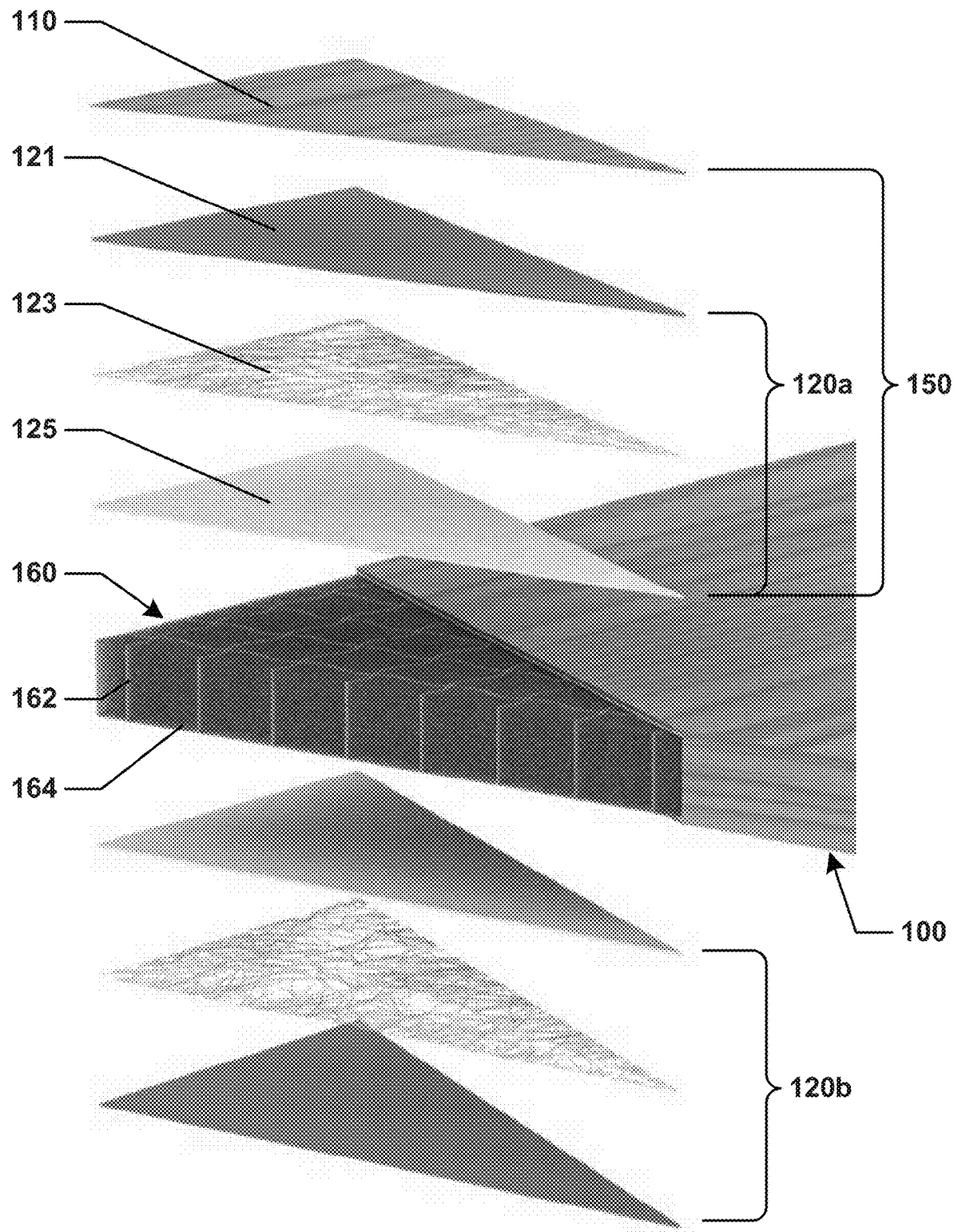
FIG. 1 is a partially exploded, perspective cross-section of one embodiment.

FIG. 1 illustrates a preferred embodiment of an acoustical panel for absorbing sound from a source (not shown but located above the panel as illustrated in FIG. 1). In general, it comprises a surface layer, visible from the room (or, more generally, the source of the sound), which the sound strikes and penetrates as described in more detail below. Beneath the surface layer (toward the interior of the panel) lies an intermediate acoustical absorbing layer, in which most of the sound energy is absorbed. Finally, a backing or base layer supports the absorbing layer and enables the panel as a whole to be mounted to a wall or ceiling.

For example, and referring specifically to FIG. 1, in this embodiment panel 100 has a surface layer 150 which comprises (for illustration only) decorative wood veneer 110 laminated to an outer surface of substrate 120*a*. In order for the decorative surface of wood veneer 110 to be effective as an acoustical panel, it must be laminated to a substrate 120*a* for support. The substrate must allow sound to pass through itself, while providing a structural base to support the hard face of veneer 110 as well as have the ability to support an edge of a similar surface as the face of the panel 100. The inner surface of substrate 120*a* faces an acoustical absorbing layer 160 located in the center (interior) of panel 100.

Substrate 120*a* is illustrated for schematic purposes only as if it comprises discrete layers 121, 123, and 125. However, this is only by way of illustration. Substrate 120*a* is best understood as composite material, comprising a non-woven or woven fabric 123 which is impregnated with binder and filler materials 121, 125 and treated to form a composite material 120*a*. In this regard, the depiction in FIG. 1 of binder material 121 as if present only on one side of fabric 123 and filler material 125 as if present only on the opposite side of fabric 123, should be understood as only for purposes of illustration. In actual practice, composite material 120*a* would have both materials mixed together throughout its thickness.

In this application, composites provide advantages in terms of reduced mass, sufficient structural strength, improved amount of support on their edge surfaces to permit edge banding, impact resistance, and environmental issues such as fire resistance where applicable.

Panel 100 further comprises a back layer 120b which could be perforated or solid. As implied by the reference numbers/letters, layers 120a and 120b are the same composition in the preferred embodiment illustrated, although it is notable that 120b does not have a veneer layer 110. This is a decided advantage, in that any veneer that might be present would add cost in terms of both raw materials, and labor to treat (coat or otherwise finish the surface of) the veneer so that layers 120a and 120b would be identical and thus balance the construction of the panel 100. Surprisingly, acoustic and mechanical performance of the panel 100 (including balance) are not degraded by the omission of a veneer layer from back layer 120b provided it is constructed as described here.

Once assembled, the panel 100 can be applied to a wall or used as a self-supporting ceiling tile. Typically the combined thickness of this panel is between three-quarter inch and four inches.

To maximize the amount of sound passing through surface layer 150 and into acoustical absorbing layer 160, surface layer 150 must be porous, which can be accomplished by providing it with openings such as holes which have been punched or otherwise created within it. Of course, the more openings or holes that are created in the material, the weaker the substrate becomes; excessive removal of the substrate material adversely affects the structural integrity of the entire panel.

As described in more detail in U.S. patent application Ser. No. 14/491,468, now U.S. Pat. No. 9,691,370, issued Jun. 27, 2017, in the most preferred embodiment but not visible in FIG. 1, surface layer 150 is microperforated with a plurality of cylindrical perforations (not visible in FIG. 1) characterized by average diameters in a range of 0.3 mm to 0.9 mm. The number of such microperforations ranges from about 100,000 to 325,000 per square meter (or about 10,000 to 30,000 per square foot). An alternative description is that, independent of the very large number of microperforations per unit area or their average diameters, only about 2% to 8% of the total surface is perforated, with 6% being a typical value. There are several known processes by which microperforations may be formed. The microperforations should be as substantially cylindrical (i.e., the sides must be as smooth) as possible and the edges where the perforations join with the upper and lower surfaces of the material in which they are formed should be as sharp as possible.

Acoustical absorbing layer 160 may be a material such as: acoustical fiberglass (which may or may not be oriented in any particular direction); rock wool; materials based on porous rocks such as lava rock; ceramics and ceramic fibers; and other known acoustically absorbing materials. As also described in more detail in U.S. Pat. No. 9,691,370, acoustical absorbing layer 160, is, in the preferred embodiment illustrated, a cellular mesh of oriented fiberglass 162 within a matrix 164, positioned on an opposite side of the surface layer 150 from the source of sound (not shown), and thus lying inside acoustical panel 100. A preferred material 162 is high-density fiberglass, having a density of six pounds per cubic foot or greater. In some embodiments, the density is preferably in the range of eight to 16 pounds per cubic foot, more preferably in the range of ten to fourteen pounds per cubic foot, and most preferably twelve pounds per cubic foot. In the most preferred embodiment, the fiberglass is arranged so that the fiber axis lies along the panel thickness direction, i.e., each of the surface layer 150 and the back layer 120b comprises respective outer and inner surfaces, and the individual "sheets" of fiberglass 162 run between the inner or inside surfaces of the surface layer 150 and back layer 120b along the direction corresponding to panel thickness. Arranging the fiberglass in this way allows sound to penetrate between the individual sheets 162 and thus more deeply into the thickness of the material, as opposed to being reflected by the surface of the topmost fiberglass sheet if the batt were oriented with the sheets parallel to the face of the panel.

Support matrix 164 performs the important function of giving the entire panel 100 rigidity and strength, thus ensuring that the front layer 150 and back layer 120b remain strongly assembled to each other. This property which is sometimes known as "tie-back (i.e., the ability to successfully "tie" the front and back surfaces of the panel together), is required to prevent the finished panel from delaminating (the greatest concern), warping or otherwise being unable to span the relatively large distances required of architectural installations (i.e., on the order of eight to fourteen feet). Because the panels are so large and visible to building occupants, even very small amounts of warping or "honeycombing" are visible across the surface of a large panel, which is unacceptable.

As illustrated in FIG. 1, the cells are square, but this is optional. Typical cell size is between one half and one inch. In general, smaller values are preferred as it is less likely that the underlying grid will be "telegraphed" to the visible front surface of the panel by way of slight variations in panel smoothness. Of course, this comes at a cost of increased amounts of material and thus total panel cost. Also as illustrated in FIG. 1, a two-dimensional support matrix 164 is illustrated, but this is only a preference. One dimensional structures are possible. Similarly, the major direction(s) of the support matrix 164 are illustrated as arranged parallel/perpendicular to the major finished panel directions, one of which typically aligns with the grain direction of wood veneer 110 (if such veneer is used). Other orientations are suitable, e.g., a forty-five degree angle to grain direction. However, depending on the dimensions of the finished panel 100, there may be difficulty assembling the edge material to the finished panel, especially if (as is common), there is little contact surface available for an adhesive to strongly bond the materials together. In this regard, the higher density fiberglass (e.g., the twelve pound per cubic foot material mentioned above) is dense enough that diagonal layout is not necessary; even the faces of the layer which show the edges of the material are sufficiently dense for edge banding to be successful with conventional adhesives.

Returning to layers 120a and 120b, wood veneer 110 is naturally hygroscopically unstable, and alternative materials such as vinyls and plastics are thermally unstable. Most decorative wall and ceiling panels utilize a veneer or other surface layer such as vinyl or laminate which is applied to a relatively high density substrate such as medium density fiberboard (MDF), particle board or veneer core materials.

Subsequently, a surface finish of some type is often applied. A dense core and a finished surface help to stabilize a decorative panel from changes in moisture in the environment. However, due to the relatively low density of the core acoustic absorbing layer 160, as compared to an MDF core, there is little substance in the core to stabilize a highly volatile surface layer 150 and thus keep the panel 100 from warping. This is compounded if the surface layer 150 is perforated to make the panel acoustical, because the perforating process opens up the surface and subsurface layers, which allows them to absorb and give off moisture or heat at an uneven and high rate.

It is not possible to apply a finish to the inside edges of openings or holes to hygroscopically stabilize the skin.

Therefore, a perforated skin 150 is very reactive to moisture and temperature changes. When a single side of a panel 100 is perforated, it becomes even more unstable and will cup to the perforated side when heat and humidity decrease, and bow away from the perforated side when heat and humidity increase.

In addition to the unsightly appearance of warped panels in a decorative application, this rapid contraction and expansion of a panel can cause a panel to migrate across a wall or a ceiling. As the panel expands, it moves predominantly in one direction, and as it contracts it can move in the same direction. This can result in panels "piling up" on one side of a wall or in a ceiling, or even falling out of the ceiling.

Prior to this work, the most common choice for a support layer for a veneer 110 was a wood fiberboard such as MDF. However, when wood fiberboard is perforated it increases its hygroscopic instability. Fiberboard is also very flammable and has great difficulty in achieving a class A fire rating without special fire treatments that often chemically alter the appearance of the veneers or other surface coverings. Other materials, such as phenolic materials, are also hygroscopically unstable when perforated, and difficult to perforate to begin with due to their extreme hardness. Various types of plastics and fiber-reinforced plastics (FRP) are thermally unstable, and the perforations made in them can plug up from heat generated during the perforating process. Other possibilities are nonferrous metals but they are expensive, thermally unstable and difficult to perforate in the thicknesses required for good impact resistance. Yet other possibilities are wood based polymers, but it is difficult to achieve the desired class A fire rating when they are used, and they are thermally unstable.

The preferred embodiment which overcomes these problems is a composite material comprising fiberglass mesh, filler material, and binder material. (Optionally, a fire-suppressing material may also be included if desired.) The fiberglass mesh provides exceptional resistance to thermal expansion and contraction, while the filler material is naturally very resistant to moisture changes. The binder material binds the filler material to the fiberglass mesh so that the composite may be easily handled for purposes of manufacturing.

The composition of the composite material is as follows. The inner woven or non-woven fabric layer may be fiberglass, Kevlar, carbon fiber, or polyester. In the preferred embodiment, it is fiberglass mesh having a density range of 0.25 to 3.0 ounces per square foot, most preferably 0.75 ounces per square foot.

Suitable binders include polyester, acrylonitrile butadiene styrene (ABS), polyethylene, polyvinylchloride (PVC), polypropylene, polystyrene, and polybutylene. A particularly preferred binder material is granular (ground) polyvinylchloride (PVC). The binders are mixed into compatible epoxies.

Suitable fillers for fire resistance, if provided, include: calcium sulfate, aluminum trihydrate, calcium carbonate, and talc. Suitable inert fillers to reduce the amount of other binders (notably epoxies) required include glass microspheres and organic (wood based) materials, although their flammable nature requires sufficient quantities of fire resistant fillers to provide sufficient fire resistance in the composite as a whole.

The materials are formed into a composite by a suitable process (given the selection of materials), such as thermally fused compression, liquid extrusion and/or calendaring, casting, and spray forming. The goal is a finished composite which is sufficient in terms of several factors: fire suppression (where applicable), ability to be perforated sufficiently well to provide the desired acoustic absorption performance; dimensional stability (with respect to both changes in temperature and humidity); sufficient ability to be cut to shape and size, and otherwise machined to form a suitable edge for edge banding; ability to be sanded or otherwise milled to a calibrated thickness and/or smoothness; ability to be painted, stained, or otherwise surface treated; ability to support adhesion (bonding) to other materials (such as the edge banding noted before, or the decorative surfaces noted before); impact resistance; and flexibility.

The resulting composite has a thickness in the range of 0.040 to 0.120 inches, typically (and preferably) in the range of 0.070 to 0.080 inches. This is slightly thicker than previously preferred layers based on MDF, which were typically about 0.060 inches in thickness. The added thickness provides a better surface for improved edge banding, but due to the different composition of the layer the added weight (if any) is not a disadvantage to the panel as a whole. Other advantages include: (1) the composite is less brittle, which allows the surface of the panel to rebound when impacted; (2) improved fire resistance; (3) improved ability to hold screws and other fasteners penetrating the composite, due to the fabric layer within the composite; and (4) improved quality of microperforations.

EXAMPLE

Acoustical panels exemplifying the principles of the various embodiments described above may be constructed as follows.

First, a subassembly is made by adhering veneer or laminate (typically wood, but it could be vinyl, paint, laminate, or metal foil) in a thickness range of 0.020 to 0.100 inches (0.075 inches being a typical value), to a durable, thermally and hygroscopically static composite.

This composite is separately manufactured by Magma Composites of River Falls, Wis. A preferred process for manufacturing the composite follows. First, polyvinylchloride (PVC) pellets (for example, pellets roughly one-eighth inch in diameter) are milled into a fine powder and combined with a fire retardant such as borate. Next, a one-half inch thick matting of PVC is applied to a conveyorized mat, a layer of fiberglass mesh is laid down on the PVC matting, and a top layer of PVC powder is laid on the top of the fiberglass mesh. This three-layer combination is matched with a thermally transparent conveyerable sheet that covers the combination. This is then conveyed into a series of rollers and high temperatures exceeding 400 degrees until the PVC melts and fuses to the fiberglass mesh. After cooling and solidification, the composite exits and is cut to size and stacked for assembly with the veneer mentioned above.

The resulting veneer/composite laminate is in the range of 0.040 to 0.120 inches in thickness, typically (and preferably) in the range of 0.070 to 0.080 inches.

Next, this subassembly is perforated in the desired pattern (i.e., number, location, and size of perforations) by a suitable known process (e.g., pins, lasers, drilling, or water-jetting).

A fiberglass reinforced sheet is separately adhered to acoustical fiberglass using an adhesive. A preferred sheet is a nonwoven web composed of glass fibers oriented in a random pattern and bonded together with a cross-linked acrylic resin system in a wet laid process, for example, a 0.58 mm thick mat known commercially as DURA-GLASS® brand mat, model number 8514 available from Johns Manville Engineer Products America of Denver, Colo.

Suitable adhesives include polyvinylacetates (PVAs), urea formaldehydes, urea melamines, and contact adhesives, as are commonly used in similar applications. Additional layers of reinforced fiberglass sheet and acoustical fiberglass are added in alternative layers to form a "bunk" of increased thickness.

The bunk is cut into strips of suitable size, which are laid out on edge such that the fiberglass mat forms the ribs (or "ribbing") alternatively with the acoustical fiberglass, thus forming a substrate in which the direction of the fiberglass layers is reoriented into the proper plane.

The perforated two-ply sheet is then applied to the reoriented fiberglass substrate and adhered in place. This "one-sided" assembly is then calibrated to a uniform thickness, and a backer sheet is applied to the face opposite from the perforated two-ply sheet to form a rigid panel. The rigid panel may then be cut or trimmed to final size and any excess overhanging material is removed from all surfaces.

The resulting panels are six times stronger, 70% lighter, and over two-and-a-half times more dimensionally stable than other acoustic panels.

Another advantage of the use of a composite layer as described above is that the resulting acoustical panel may be bent to a greater degree than was feasible for the panels described in U.S. Pat. No. 9,691,370. Those panels could be feasibly bent to a radius of about twelve inches without breaking, whereas comparable acoustic panels using the composite described above may be bent to a radius of about three inches.

Figure 2:
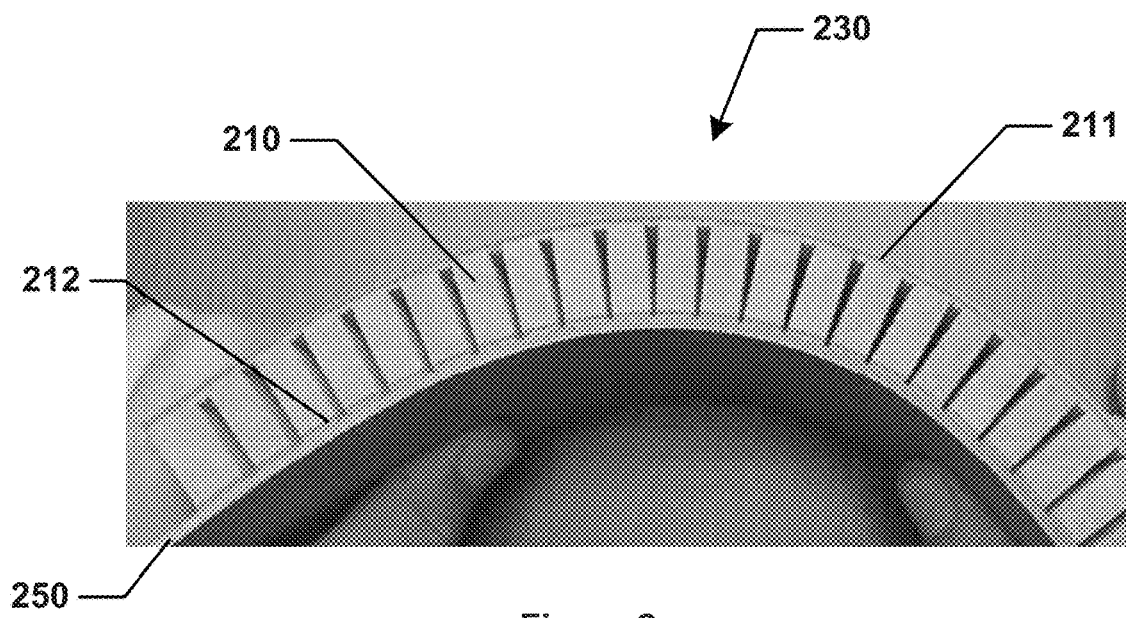
FIGS. 2-4 are perspective schematic views of alternative embodiments.
Figure 3:
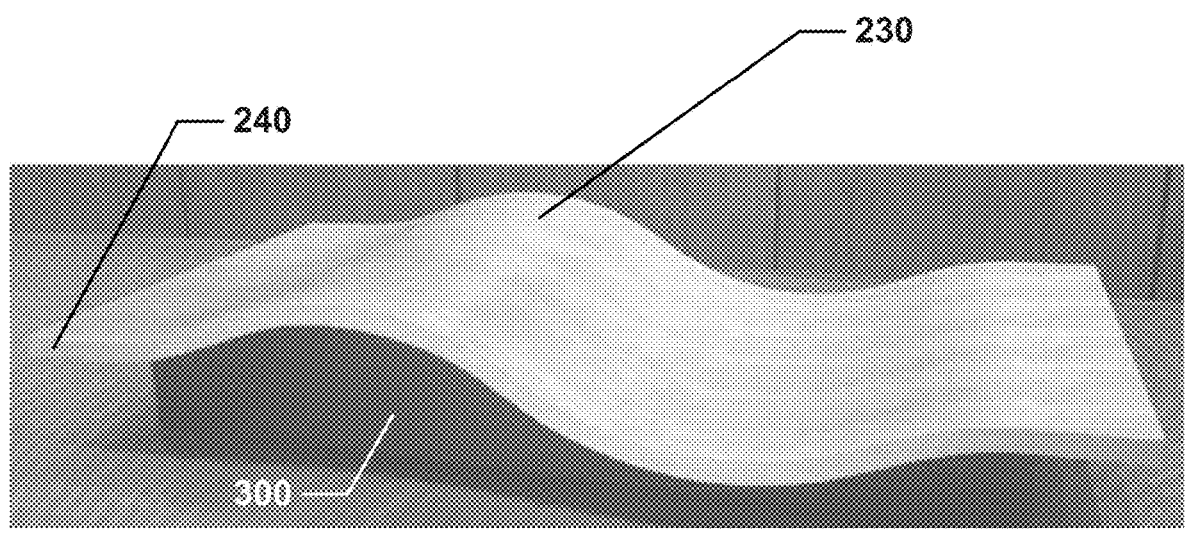
Figure 4:
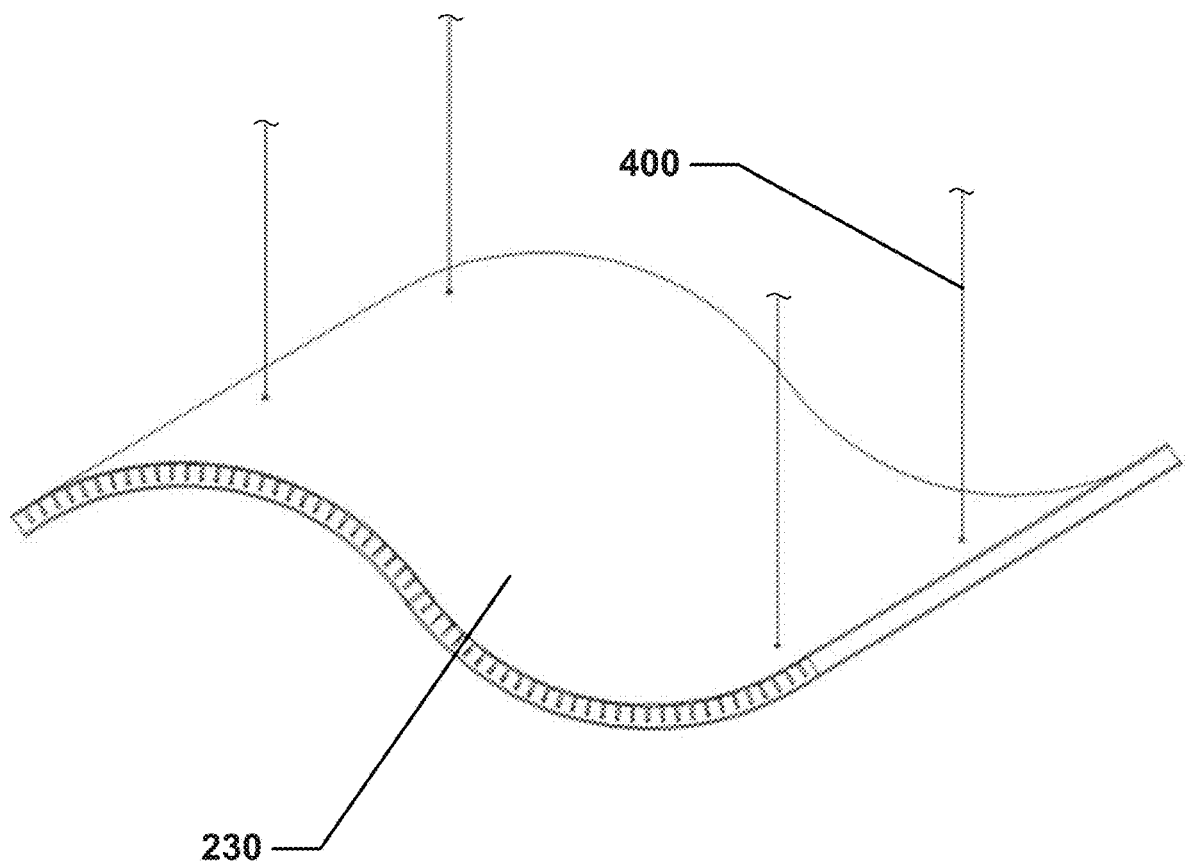

FIGS. 2-4 are schematic views of an alternative embodiment according to the principles described above, specifically examples of lightweight curved ceiling panel assemblies which may be installed without the use of heavy and costly structural supports. In general terms, such an assembly comprises at least one panel created as described above, although two such panels are constructed in the same manner may be used. Any such panel has a back face defining a series of kerfs, and an added backing layer providing flexible structure to the kerfed back face.

As specifically illustrated in FIG. 2, the back of panel 210 is repeatedly slit or kerfed (e.g., with a saw blade or any other suitable tool) to within approximately ⅛" from the surface of its face 211, producing a series of slits or kerfs spaced ½"-1" apart. The slits or kerfs can expand or contract when the panel is flexed either convexly or concavely with respect to the uncut outer or front (microperforated) surface 211. In addition to enabling this change in shape, the slits or kerfs provide clearance that precludes undue compression of the acoustical absorption material and other internal structure of the panel. Such compression could, consistent with the principles discussed above, reduce the acoustic absorption performance of the assembly.

After the panel 230 is assembled and cut to exact dimensions, a matching surface 240 can be applied to the edge to cover the exposed substrate. (The panel illustrated in FIG. 3 lies on a support platform 300 that forms no part of the panel or the installation system.) This allows the panel 230 to not only be decorative, and highly acoustically absorbent, but also act as an acoustical diffuser for use in performing arts centers and theaters.

As specifically shown in FIG. 4, the panel 230 may be hung (as by one or more cables or rods 400 or the equivalent) from a ceiling or other structure (not shown for clarity), or otherwise supported or suspended "in air" without losing its serpentine shape. When such a panel is suspended overhead, it may be desirable to microperforate only the lower, ground-facing, panel and not the panel which will face upward.

We claim:

1. A surface layer for an acoustical panel for absorbing sound from a source, in which the panel comprises an acoustical absorbing layer, on an opposite side of the surface layer from the source of sound; in which the surface layer comprises a thermally and hygroscopically stable composite comprising a non-woven or woven fabric impregnated with binder and filler materials; and in which the surface layer defines within itself a plurality of microperforations.

2. The surface layer of claim 1, in which the surface layer has inner and outer faces, and further comprises, laminated to the outer face of the surface layer, one of decorative wood veneer, vinyl, decorative laminate, or paint; the acoustical absorbing layer being adjacent the inner face of the substrate.

3. The surface layer of claim 1, in which the fabric is fiberglass.

4. An acoustical panel for absorbing sound from a source, comprising:
   a. a surface layer defining within itself a plurality of microperforations, comprising a thermally and hygroscopically stable composite comprising a non-woven or woven fabric impregnated with binder and filler materials;
   b. an acoustical absorbing layer, on an opposite side of the surface layer from the source of sound; and
   c. a back layer on an opposite side of the acoustical absorbing layer from the surface layer.

5. The acoustical panel of claim 3, in which the back layer comprises a thermally and hygroscopically stable composite comprising a non-woven or woven fabric impregnated with binder and filler materials.

6. The acoustical panel of claim 3, in which the surface layer has inner and outer faces, and further comprises, laminated to the outer surface of the surface layer, one of decorative wood veneer, vinyl, decorative laminate, or paint; the acoustical absorbing layer being adjacent the inner surface of the substrate.

7. The acoustical panel of claim 3, in which the back layer is perforated.

8. An assembly comprising at least one panel for absorbing sound from a source, the panel comprising:
   a) a surface layer defining within itself a plurality of microperforations, comprising a thermally and hygroscopically stable composite comprising a non-woven or woven fabric impregnated with binder and filler materials;
   b) an acoustical absorbing layer, on an opposite side of the surface layer from the source of sound; and
   c) a back layer on an opposite side of the acoustical absorbing layer from the surface layer.

9. The assembly of claim 8, in which the assembly is in a non-planar configuration.

10. The assembly of claim 8, in which the surface layer has inner and outer faces, and further comprises, laminated to the outer face of the surface layer, one of decorative wood veneer, vinyl, decorative laminate, or paint; the acoustical absorbing layer being adjacent the inner surface of the substrate.

* * * * *